United States Patent [19]
Taylor

[11] Patent Number: 5,926,524
[45] Date of Patent: Jul. 20, 1999

[54] MESSAGING SYSTEM SCRATCHPAD FACILITY

[75] Inventor: Don W. Taylor, Louisville, Colo.

[73] Assignee: Lucent Technologies Inc., Murray Hill, N.J.

[21] Appl. No.: 08/947,988

[22] Filed: Oct. 9, 1997

Related U.S. Application Data

[63] Continuation of application No. 08/583,361, Jan. 5, 1996, abandoned.

[51] Int. Cl.$^6$ ............... H04M 1/64; H04M 11/00; H04M 3/42

[52] U.S. Cl. ............ 379/88.08; 379/67.1; 379/71; 379/76; 379/88.01; 379/93.01; 379/201

[58] Field of Search ............... 379/67.1, 71, 76, 379/88.01, 88.08, 88.12, 88.16, 88.18, 88.22, 93.01, 201

[56] References Cited

U.S. PATENT DOCUMENTS

| | | | |
|---|---|---|---|
| 4,625,081 | 11/1986 | Lotito et al. | 379/88 |
| 4,757,525 | 7/1988 | Matthews et al. | 379/89 |
| 4,916,726 | 4/1990 | Morley, Jr. et al. | 379/88 |
| 4,985,913 | 1/1991 | Shalom et al. | 379/76 |
| 5,008,835 | 4/1991 | Jackmann et al. | 364/513.5 |
| 5,220,596 | 6/1993 | Patel | 379/94 |
| 5,283,818 | 2/1994 | Klausner et al. | 379/67.1 |
| 5,283,856 | 2/1994 | Gross et al. | 395/51 |
| 5,367,609 | 11/1994 | Hopper et al. | 395/2.87 |
| 5,448,695 | 9/1995 | Douglas et al. | 395/155 |
| 5,504,805 | 4/1996 | Lee | 379/67.1 |
| 5,737,393 | 4/1998 | Wolf | 379/67 |

OTHER PUBLICATIONS

AT&T Owner's Manual: Mobile Cellular Telephone 3030, p. 64.

AT&T brochure: The AT&T Intuity ™ System Message Manager, 1994, 4 pages.

AT&T brochure: The AT&T Intuity™ AUDIX Voice Messaging System, 1994, 4 pages.

AT&T brochure: Intuity ™ Voice Processing Solutions, 1994, 12 pages (including inserts).

H. Newton, If My PC, and 105 Million Others, Were a Phone, Computer Telephony, vol. 3, Issue 8, Aug. 1995, 5 pages.

*Primary Examiner*—Fan S. Tsang
*Assistant Examiner*—Allan Hoosain
*Attorney, Agent, or Firm*—David Volejnicek

[57] ABSTRACT

An improved messaging system (100, 900) enables a message recipient to take notes electronically while retrieving messages, such as by electronically extracting and separately recording a portion of a received message in a scratchpad area (250, 1050) of his or her mailbox (111, 911) or by dictating into a telephone (102, 103), typing on a terminal (902, 903) keyboard, or entering on a Touch-Tone telephones' keypad, words and/or numbers, into the scratchpad area, for subsequent use by the message recipient. The messaging system then enables the message recipient either to retrieve the electronic notes from the scratchpad area, or to automatically place a call to a telephone number that is contained in the electronic notes in the scratchpad area. An improved graphical user interface (915) provides the message recipient with easy access to, and control over, this functionality of the messaging system.

21 Claims, 10 Drawing Sheets

MESSAGING SYSTEM SCRATCHPAD FACILITY

This application is a continuation of application Ser. No. 08/583,361, filed on Jan. 5, 1996 now abandoned.

TECHNICAL FIELD

This invention relates generally to telecommunications messaging systems, and relates specifically to user features of such systems.

BACKGROUND OF THE INVENTION

Various types of telecommunications messaging systems are well known to the art. They include voice-mail systems, e-mail systems, and multi-media messaging systems. Often while a message recipient is retrieving (e.g., listening to) received messages, he or she needs to jot down information, such as names, addresses, numbers, or parts of the message, until he or she is ready to act on this information. The need arises from the capacity limits and fallibility of human short-term memory.

Acting on the information may involve any kind of action, such as making calendar or schedule notes, entering data in a database, making a telephone call or sending an electronic message in response to the received message, etc. A common theme that predicates these actions is that the information to be acted upon needs to be retained only temporarily—until the action is taken. Hence, the message recipient typically takes notes on a piece of paper while retrieving messages, and then discards the notes after taking the requisite action. Not only is this inconvenient for the message recipient, but it also provides opportunities for the recipient to transcribe the information incorrectly and to misplace the information. A further disadvantage is that known messaging systems do not provide for automatically calling others or sending messages to others in response to the received messages, except in cases where the return call or message is to the originator of the received message and the originator is a subscriber of the messaging system. In other instances, the message recipient must terminate the message-retrieval transaction and then initiate a new transaction (e.g., manually place a call or address a message) in response to the retrieved message. Again, this is inconvenient for the message recipient and provides opportunities for mis-addressing (e.g., mis-dialing) the response.

SUMMARY OF THE INVENTION

This invention is directed to solving these and other problems and disadvantages of the prior art. Illustratively according to the invention, the message recipient is provided by the messaging system with an ability to take notes electronically while retrieving messages, such as by electronically extracting and separately recording portions of a received message or by dictating or keying in words and numbers, for subsequent playback to the message recipient, and is preferably further provided with the ability to automatically place communications (e.g., to call or to send a message) to telephone numbers or addresses that are included in the electronic notes.

This capability illustratively comprises two main parts: information recording, and information retrieval. A Touch-Tone, speech-recognition, and/or graphical user interface-based command set is illustratively available to the message recipient for use while retrieving received messages. These commands activate and deactivate information recording into a scratchpad memory space, during which "clips" of the received message, the message recipient's own spoken commentary, spoken or Touch-Tone or typed digits, and/or text typed by the subscriber, can be electronically recorded in the scratchpad. For information retrieval, illustratively commands are available to access the scratchpad, either during the same or during a subsequent message retrieval session—i.e., the scratchpad is optionally not erased at the end of the original message retrieval session. The access commands enable playback or display of the recorded message clip, spoken or typed commentary, and stored digits. They illustratively also enable the automatic origination of a secondary communication (e.g., a call) to the address (e.g., a telephone number) represented by the scratchpad contents. During a secondary call, the messaging system is "bridged" to the call so that control can return to the messaging system at any time. During, or at the end of, this secondary call, commands illustratively are available to return the message recipient to interacting with the messaging system for continued message retrieval, etc.

According to one aspect of the invention, improvements are made to a messaging system that has a memory for storing messages received for a message recipient from message senders, a user interface enabling the message recipient to communicate with the messaging system and retrieve the stored messages, and a controller connected to the user interface and to the memory for controlling operation of the messaging system. First means in the controller halt retrieval of a message in response to receipt of a first command from the message recipient during the retrieval of the stored message, thereafter store information received from the message recipient in the memory for subsequent use by the message recipient, and thereafter resume the retrieval of the message in response to receipt of a second command from the message recipient. Second means in the controller then either present the stored information back to the message recipient or establish a communication from the message recipient to a destination by using the stored information, in response to receipt of a third command from the message recipient. Preferably, third means respond to receipt of a fourth command from the message recipient during retrieval of a stored message by demarcating under the message recipient's control, or by extracting and separately storing a portion of the retrieved stored message selected by the message recipient, whereupon the second means respond to the third command by either presenting the selected message portion back to the message recipient or establishing a communication from the message recipient to a destination by using information contained in the selected message portion.

According to another aspect of the invention, there is provided an improved graphical user interface to a messaging system having a memory for storing messages received for a message recipient from message senders and a system interface for communicating with the graphical user interface to enable the message recipient to interact with the messaging system via the graphical user interface and retrieve the stored messages. The graphical user interface comprises first means that respond to receipt of a first command from the message recipient during retrieval of a stored message by causing the messaging system to halt the retrieval of the message and to store information received from the message recipient in the memory for subsequent use by the message recipient, and thereafter respond to receipt of a second command from the message recipient by causing the messaging system to resume the retrieval of the message. The graphical user interface further comprises second means that respond to receipt of a third command from the message recipient by causing the messaging system either to present the stored information back to the message recipient or to establish a communication from the message recipient to a destination by using the information that is stored in the memory. Preferably, the graphical user interface further comprises third means that respond to receipt of a fourth command from the message recipient during retrieval of a stored message by causing the messaging system to extract a portion, selected by the message recipient, of the retrieved stored message and to store the extracted portion in the memory, whereupon the second means respond to the third command by causing the messaging system either to present the stored extracted portion back to the message recipient or to establish a communication from the message recipient to a destination by using an address contained in the stored extracted portion. The improved graphical user interface is illustratively implemented in a computer-usable program storage device—such as a floppy disk, for example—that has the first, second and third means—which are computer-readable program code means—embodied therein for causing the computer to perform the functions of the improved graphical user interface.

These and other advantages and features of the invention will become more apparent from the following description of an illustrative embodiment of the invention, taken together with the drawing.

BRIEF DESCRIPTION OF THE DRAWINGS

FIGS. 10–13 and 4–7 are a flow diagram of operations of the messaging system of FIG. 2 that implement the embodiment of the invention in FIG. 9.

DETAILED DESCRIPTION

Figure 1:
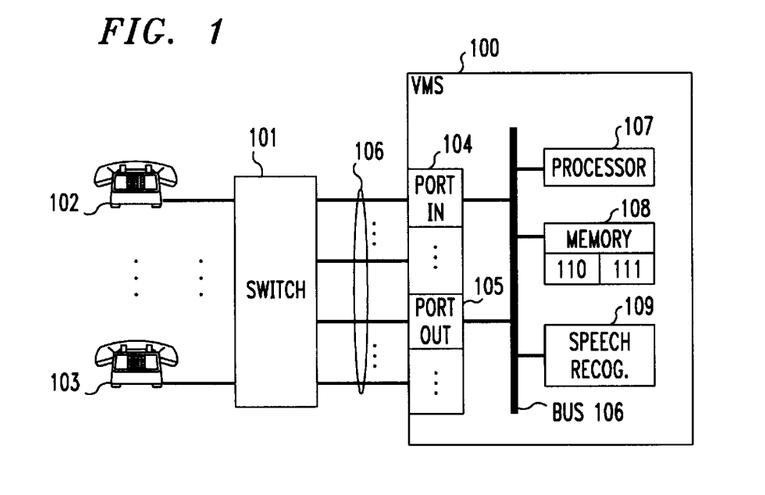
FIG. 1 is a block diagram of a first illustrative messaging system that implements a first illustrative embodiment of the invention.

FIG. 1 shows an illustrative messaging system. It comprises a voice messaging system (VMS) 100 connected by a conventional telephone switch 101 to a plurality of conventional telephones 102–103. Switch 101 is illustratively either a central office switch such as an AT&T (now Lucent Technologies) 5 ESS® switch, or a private branch exchange (PBX) such as the AT&T (now Lucent Technologies) Definity® PBX. VMS 100 is illustratively a voice messaging system implemented on the AT&T (now Lucent Technologies) Intuity Conversant® interactive voice response (IVR) platform, or the AT&T (now Lucent Technologies) Audix® or AT&T Intuity® VMS. VMS 100 comprises a plurality of telephone-line input ports (PORT IN) 104 and a plurality of telephone-line output ports (PORT OUT) 105 that are connected to switch 101 by telephone lines 106. Ports 104 and 105 are conventional circuits. They serve as interfaces for subscribers' and other callers' calls to VMS 100. They each include analog-to-digital (A-D) and digital-to-analog (D-A) conversion circuitry and Touch-Tone signal-recognition circuitry, such as a digital signal processor (DSP).

Ports 104 and 105 are connected by a communications medium, such as a digital bus (BUS) 106, to a control processor (PROC) 107, a bulk memory (MEM) 108, and speech recognition facility (SP. RECOG.) 109. VMS 100 is a stored-program-controlled unit, operating under control of programs 110 stored in memory 108 and executed by processor 107. Memory 108 also implements mailboxes 111 of subscribers of the messaging system of FIG. 1. Mailboxes 111 store messages received from message senders for message recipients.

As described so far, the messaging system of FIG. 1 is conventional. According to the invention, the functionality of VMS 100 is enhanced by inclusion, among programs 110, of control programs that implement a scratchpad facility shown in FIGS. 2–8.

Figure 2:
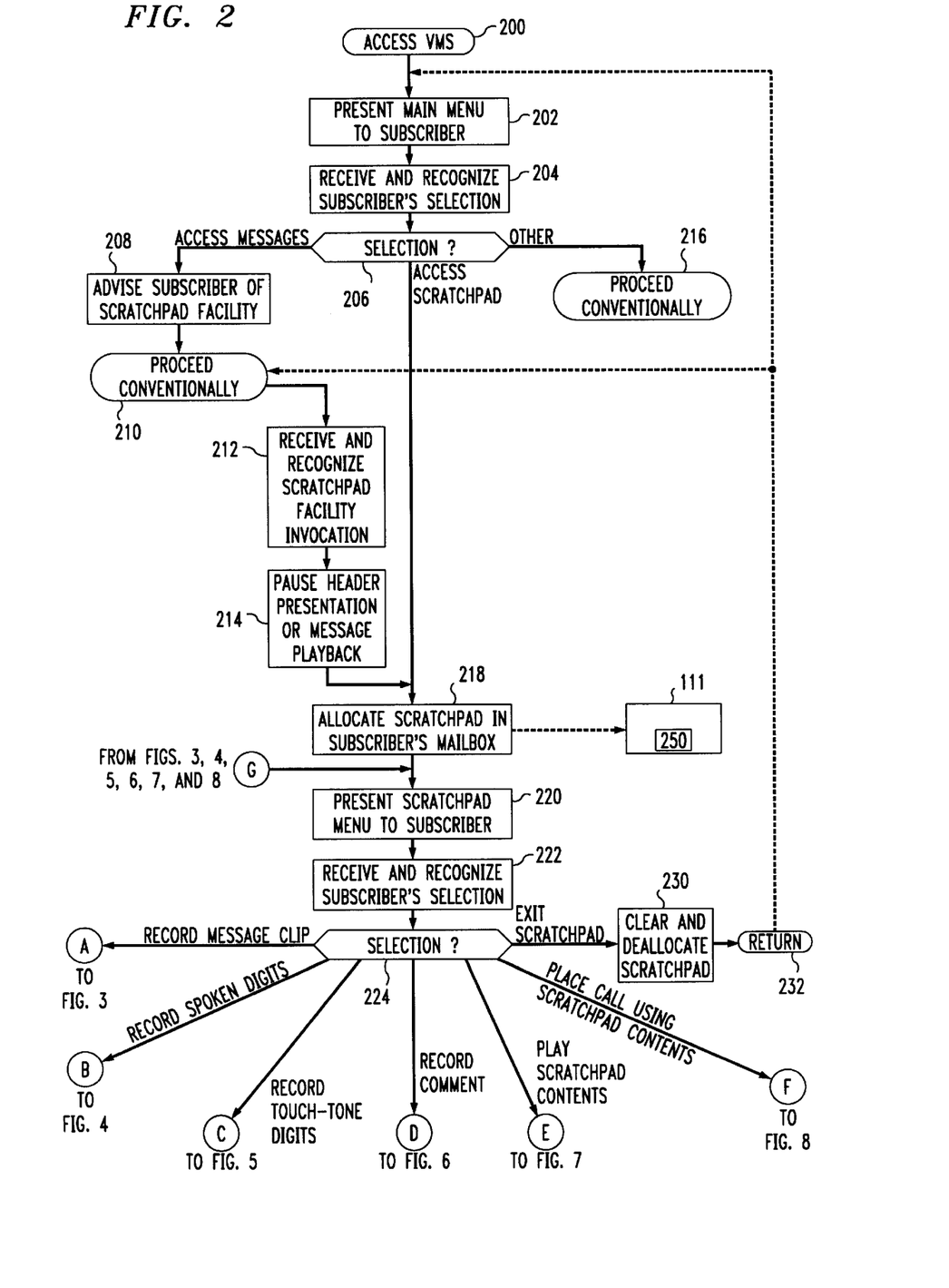
FIGS. 2–8 are a flow diagram of operations of the messaging system of FIG. 1 that implement the embodiment of the invention in FIG. 1.

A subscriber of the messaging system of FIG. 1 accesses his or her mailbox 111 in VMS 100 by means of a telephone 102 or 103 in the conventional manner, at step 200 of FIG. 2. In response, the subscriber is presented with a main menu of options for possible actions, at step 202. The main menu conventionally includes an "access messages" option. The main menu is also expanded to include an "access scratchpad" option. The subscriber selects (invokes) one of the options, illustratively by speaking the selected option into the telephone or by inputting a Touch-Tone signal sequence on the keypad of the telephone. VMS 100 receives and recognizes the subscriber's selection, at step 204; Touch-Tone signals are recognized by the DSP circuitry of the input port 104 to which the subscriber's telephone is connected, while a spoken selection is recognized by speech recognition facility 109.

If the subscriber selects an option other than "access messages" or "access scratchpad", as determined at step 206, VMS 100 responds conventionally, at step 216. If the subscriber selects the "access messages" option, VMS 100 optionally plays a pre-recorded announcement to the subscriber informing the subscriber that the subscriber may invoke the scratchpad facility at any time either by speaking the "access scratchpad" option into the telephone or by entering the option's corresponding Touch-Tone signal sequence on the telephone keypad, at step 208. VMS 100 then proceeds to interact with the subscriber in the conventional manner, at step 210.

If at any time during the presentation of the message headers or during message playback (retrieval of the message body), at step 210, the subscriber invokes the scratchpad facility, as determined at step 212, VMS 100 pauses header presentation or message playback, at step 214, and then proceeds as if the subscriber had selected the "access scratchpad" option at step 204, at step 218.

Following step 214, or if the subscriber is determined to have selected the "access scratchpad" option at step 206, VMS 100 creates a scratchpad 250 by allocating some of the storage space in the subscriber's mailbox 111 to the scratchpad function, at step 218. VMS 100 then presents a scratchpad menu to the subscriber. This menu includes the following options: record message clip, record spoken digits, record Touch-Tone digits, record comment, play scratchpad contents, and place call using scratchpad contents. Each option has a Touch-Tone signal sequence associated therewith, and may be selected (invoked) by the subscriber either by speaking the option into the telephone or keying the corresponding Touch-Tone signal sequence into the telephone's keypad. When the subscriber makes a selection, VMS 100 receives and recognizes the selection, at step 222, in the same manner as described above for step 204.

Figure 3:
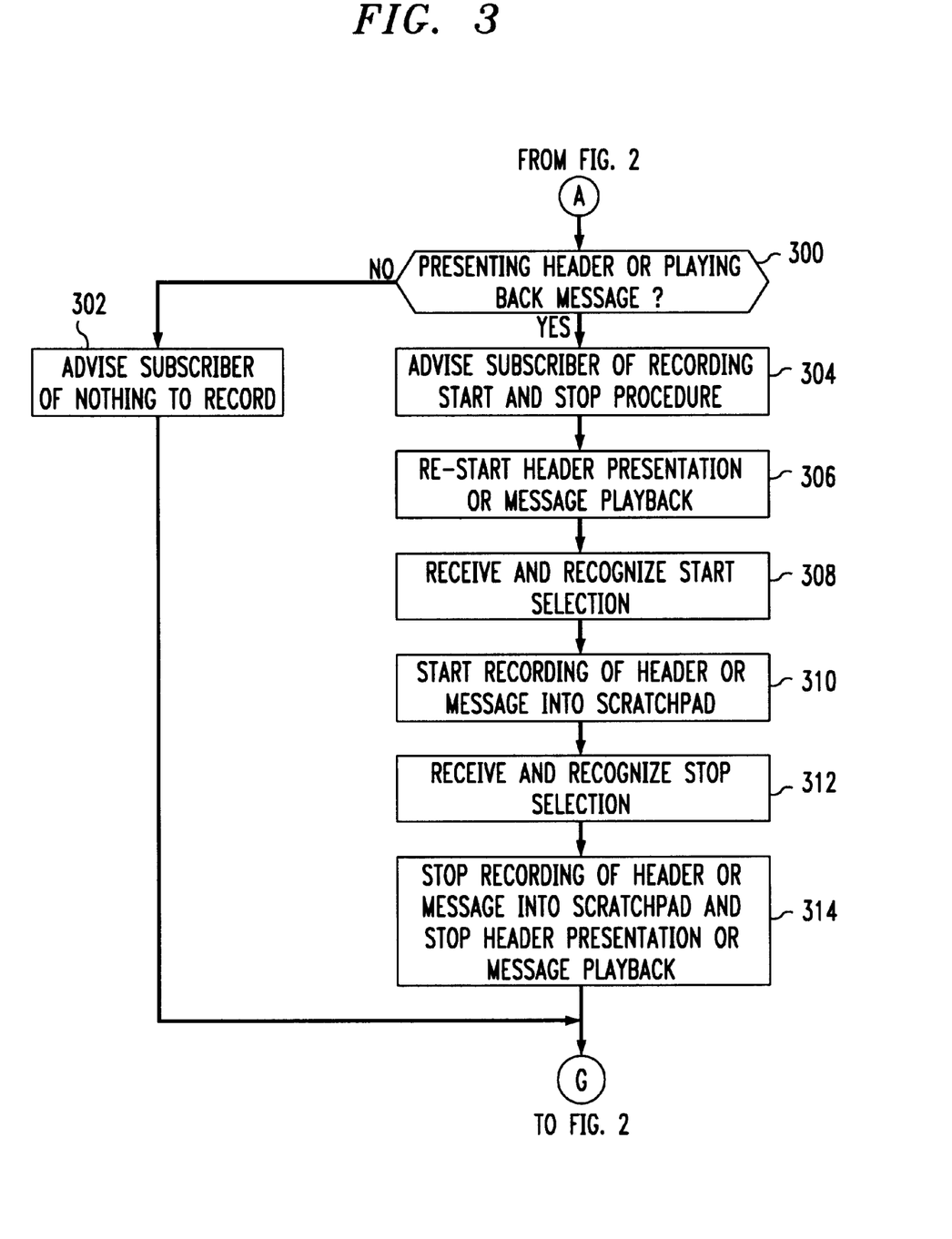

If the subscriber selects to record a message clip, as determined at step 224, VMS 100 checks whether it was in the process of presenting a header or playing a message, i.e., whether it reached steps 218 et seq. via steps 208 and 210, at step 300 of FIG. 3. If not, VMS 100 plays a pre-recorded message to the subscriber stating that there is nothing to record, at step 302, and then returns to step 220; if so, VMS 100 plays a pre-recorded message to the subscriber asking the subscriber to demarcate the message portion that the subscriber wishes to record, by either speaking "start" or hitting a predetermined key on the telephone keypad at the point in the header presentation or message playback at which the subscriber wants to commence recording of the header or message into scratchpad 250, and by either speaking "stop" or hitting a predetermined key on the telephone keypad at the point in the header presentation or message playback at which the subscriber wants to cease recording of the header or message into scratchpad 250, at step 304. VMS 100 then presents the header or plays back the message, that it had been presenting or playing at step 212, from the beginning, at step 306. Upon receiving and recognizing the subscriber's recording-start selection during the header presentation or message playback of step 306, at step 308, VMS 100 commences to record the presented header or played-back message into scratchpad 250, at step 310. Upon receiving and recognizing the subscriber's recording-stop selection during the header presentation or message playback of step 306, at step 312, VMS 100 ceases to record the presented header or played-back message into scratchpad 250 and also ceases the header presentation or message playback that it had started at step 306, at step 314. VMS 100 then returns to step 220 of FIG. 2.

Alternatively, instead of extracting the demarcated message portion and separately recording it in scratchpad 250, VMS 100 may merely store in scratchpad 250 the address pointers that demarcate the selected message portion.

Figure 4:
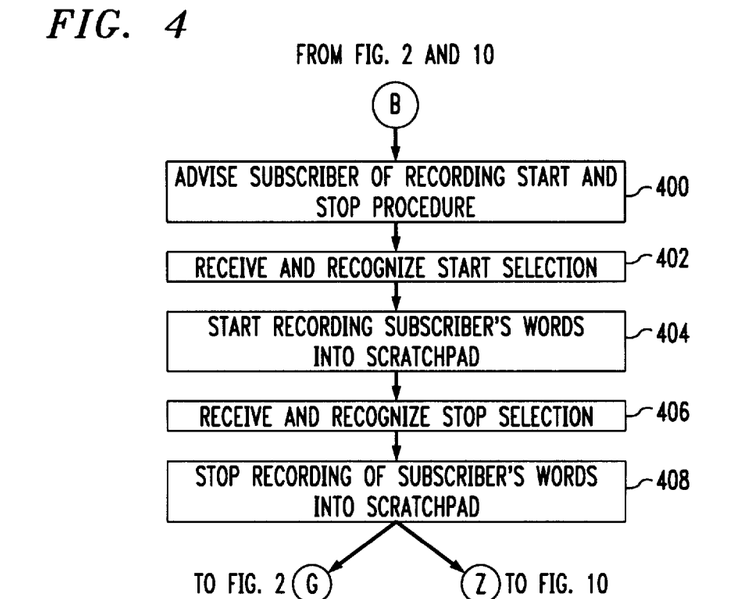

If the subscriber selects to record spoken digits, as determined at step 224, VMS 100 plays a pre-recorded message to the subscriber asking the subscriber to either speak "start" or hit a predetermined key on the telephone keypad before speaking the digits into the telephone, and to either speak "stop" or hit a predetermined key on the telephone keypad when finished speaking the digits, at step 400 of FIG. 4. Upon receiving and recognizing the subscriber's recording-start selection, at step 402, VMS 100 commences to record the subscriber's spoken words into scratchpad 250, at step 404. Upon receiving and recognizing the subscriber's recording-stop selection, at step 406, VMS 100 ceases to record the subscriber's spoken words into scratchpad 250, at step 408. Optionally, VMS 100 may echo the subscriber's spoken words back to the subscriber and request the subscriber's confirmation that the spoken words were recorded correctly. VMS 100 then returns to step 220 of FIG. 2.

Figure 5:
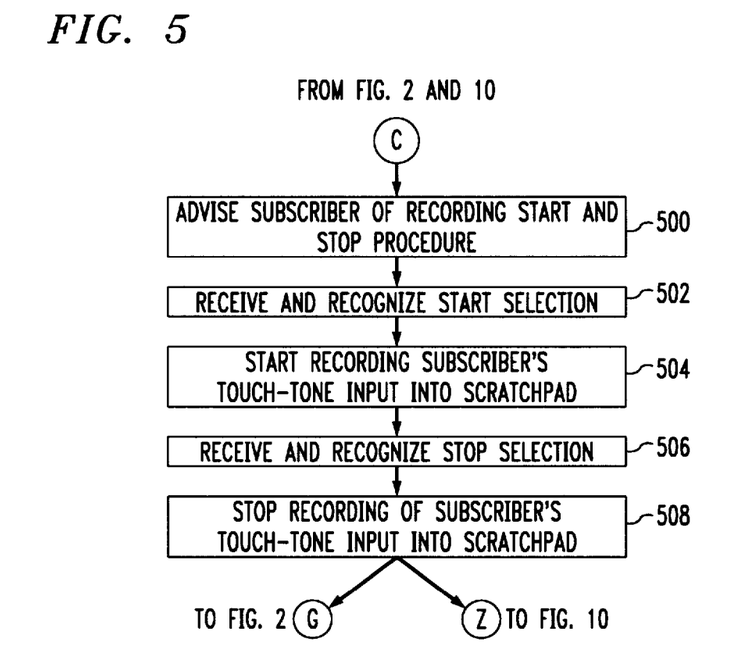

If the subscriber selects to record Touch-Tone digits, as determined at step 224, VMS 100 plays a pre-recorded message to the subscriber asking the subscriber to either speak "start" or hit a predetermined key on the telephone keypad before entering the digits on the telephone keypad, and to either speak "stop" or hit a predetermined key on the telephone keypad when finished entering the digits on the telephone keypad, at step 500 of FIG. 5. Upon receiving and recognizing the subscriber's recording-start selection, at step 502, VMS 100 commences to record the subscriber's Touch-Tone input into scratchpad 250, at step 504. Upon receiving and recognizing the subscriber's recording-stop selection, at step 506, VMS 100 ceases to record the subscriber's Touch-Tone input into scratchpad 250, at step 508. Again, VMS 100 may optionally echo the entered Touch-Tone digits back to the subscriber and request the subscriber's confirmation that they were "heard" and recorded correctly. VMS100 then returns to step 220 of FIG. 2.

Figure 6:
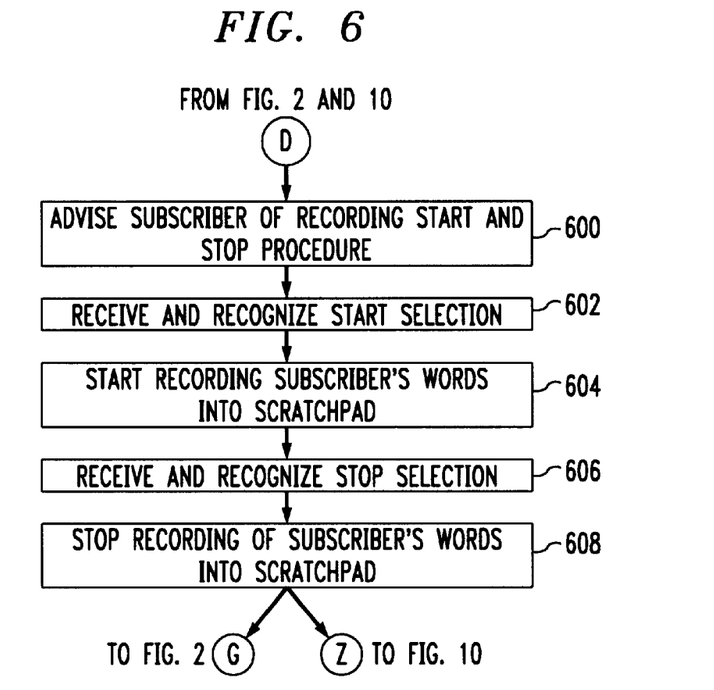

If the subscriber selects to record a comment, as determined at step 224, VMS 100 plays a pre-recorded message to the subscriber asking the subscriber to either speak "start" or hit a predetermined key on the telephone keypad before entering (e.g., speaking) the comment into the telephone, and to either speak "stop" or hit a predetermined key on the telephone keypad when finished speaking the comment, at step 600 of FIG. 6. Upon receiving and recognizing the subscriber's recording-start selection, at step 602, VMS 100 commences to record the subscriber's audio input—words, phrases, songs, music, Touch Tones, or other sounds—into scratchpad 250, at step 604. Upon receiving and recognizing the subscriber's recording stop selection, at step 606, VMS 100 ceases to record the subscriber's audio input into scratchpad 250, at step 608, and then returns to step 220 of FIG. 2.

Figure 7:
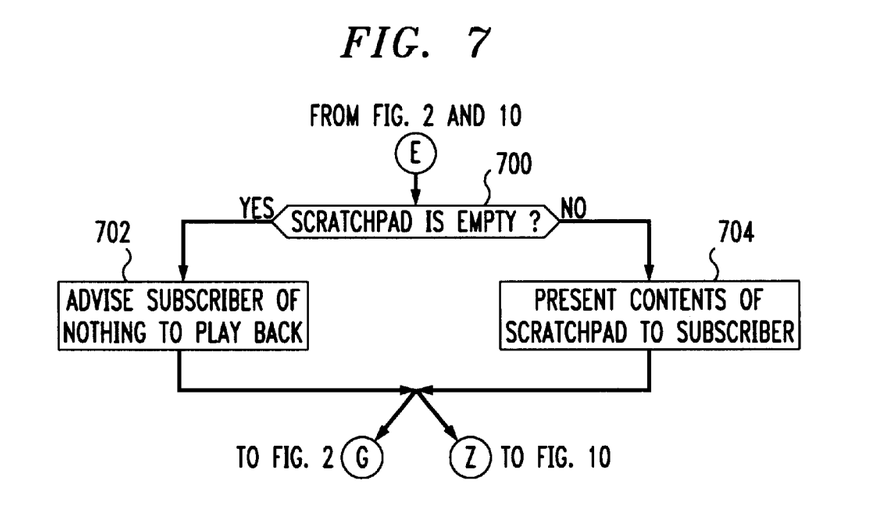

If the subscriber selects to play back scratchpad contents, as determined at step 224, VMS 100 checks whether scratchpad 250 is empty, at step 700 of FIG. 7. If so, VMS 100 plays a pre-recorded announcement to the subscriber informing the subscriber that there is nothing to play back, at step 702, and then returns to step 220 of FIG. 2; if not, VMS 100 plays back the contents of scratchpad 250 to the subscriber, at step 704. VMS 100 then returns to step 220 of FIG. 2.

Figure 8:
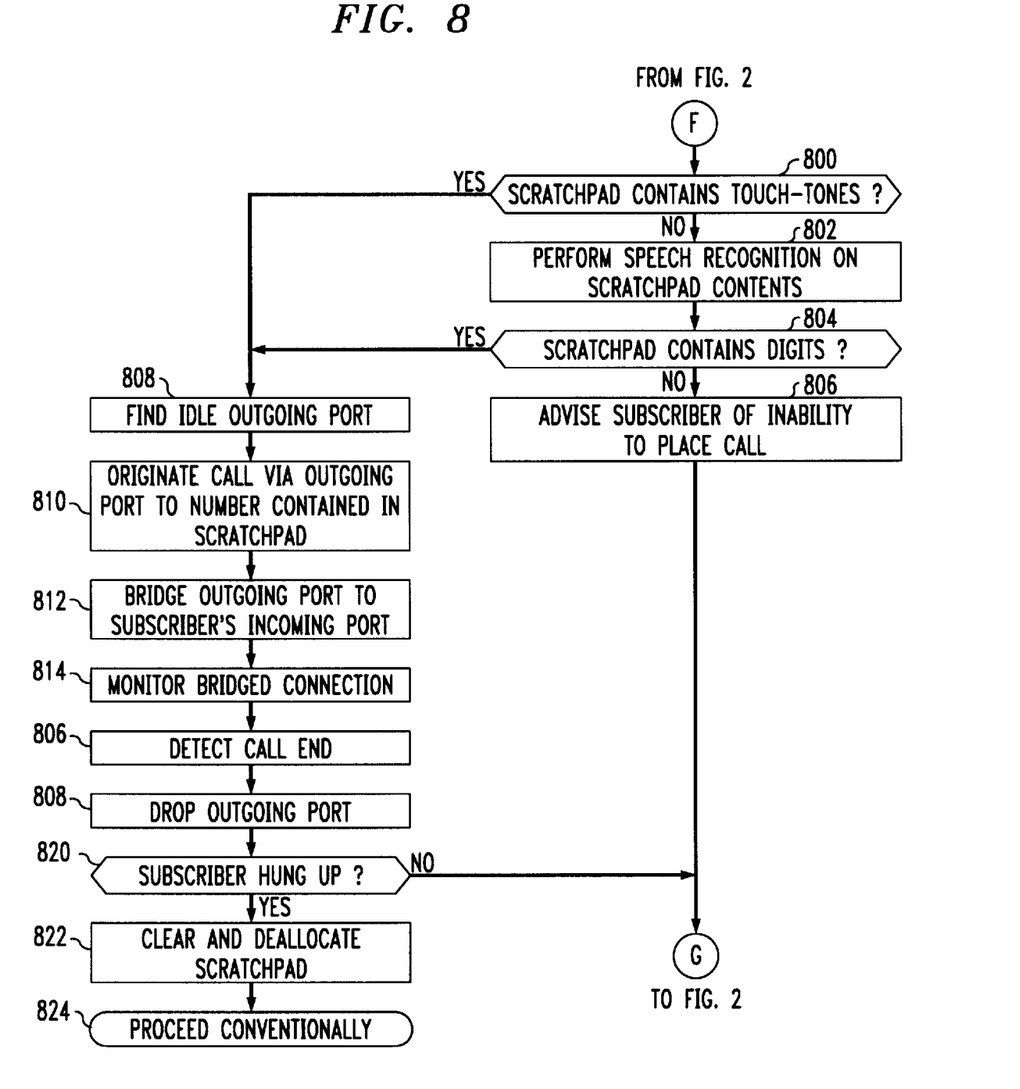

If the subscriber selects to place a call using the scratchpad contents, as determined at step 224, VMS 100 examines the scratchpad contents to determine if scratchpad 250 contains Touch-Tone signals or spoken words, at step 800 of FIG. 8. If scratchpad 250 contains spoken words, VMS 100 processes the scratchpad contents through voice-recognition facility 119, at step 802, and then determines from the results of voice recognition whether scratchpad 250 contains digits, at step 804. If scratchpad 250 is determined to not contain digits, VMS 100 plays a pre-recorded announcement to the subscriber informing the subscriber that a call cannot be placed by using scratchpad contents, at step 806, and then returns to step 220 of FIG. 2. If scratchpad 250 is determined to contain digits at step 804, or Touch-Tones at step 800, VMS 100 finds an idle one of the outgoing ports 205, at step 808, and originates a call therethrough to a telephone number represented by the digits that are contained in scratchpad 250, at step 810. VMS 100 then bridges the outgoing port 205 to the incoming port 204 on which it is communicating with the subscriber, at step 812, and monitors the bridged connection, at step 814. If the number contained in scratchpad 250 is a valid telephone number, switch 101 establishes the requested call, and if the call is answered, the subscriber and the called party carry on a normal telephone call. If the switch 101 cannot establish the call, it drops the connection to the outgoing port 205. If the established call is not answered, the subscriber ends the call either by flashing the switch hook of the telephone, keying in a "drop" Touch-Tone sequence on the telephone's keypad, saying "drop" into the telephone, or simply hanging up. If and when the established and answered call is finished, either the called party hangs up or the subscriber ends the call in one of the manners mentioned above. In either one of these three scenarios, VMS 100 detects the end of the call via the monitored bridged connection, at step 816, and in response drops the outgoing port 205 from the connection and frees it, in a conventional manner, at step 818. VMS 100 then checks the connection to the subscriber at incoming port 204 to determine if the subscriber hung up, at step 820. If so, VMS 100 optionally clears and deallocates scratchpad 250, at step 822, and then proceeds conventionally to close the subscriber's mailbox and end the session with the subscriber, at step 824. If the subscriber did not hang up, VMS 100 returns to step 220 of FIG. 2.

If the subscriber again selects one of the recording options at step 222, the additional recording is made over the previous recording in scratchpad 250, whereby the original recording in scratchpad 250 is destroyed. Alternatively, the additional recording may be appended to the previous recording in scratchpad 250, whereby both recordings are preserved in scratchpad 250.

If the subscriber selects to exit the scratchpad menu, as determined at step 224, VMS 100 optionally clears and deallocates scratchpad 250, at step 230, and then returns to the place from which the scratchpad was accessed, at step 232: if the scratchpad was accessed during accessing of messages, VMS 100 returns to step 210 and continues message header presentation or message playback from the point at which it paused at step 214; and if the scratchpad was accessed from the main menu at step 206, VMS 100 returns to step 202 to again present the main menu to the subscriber.

Figure 9:
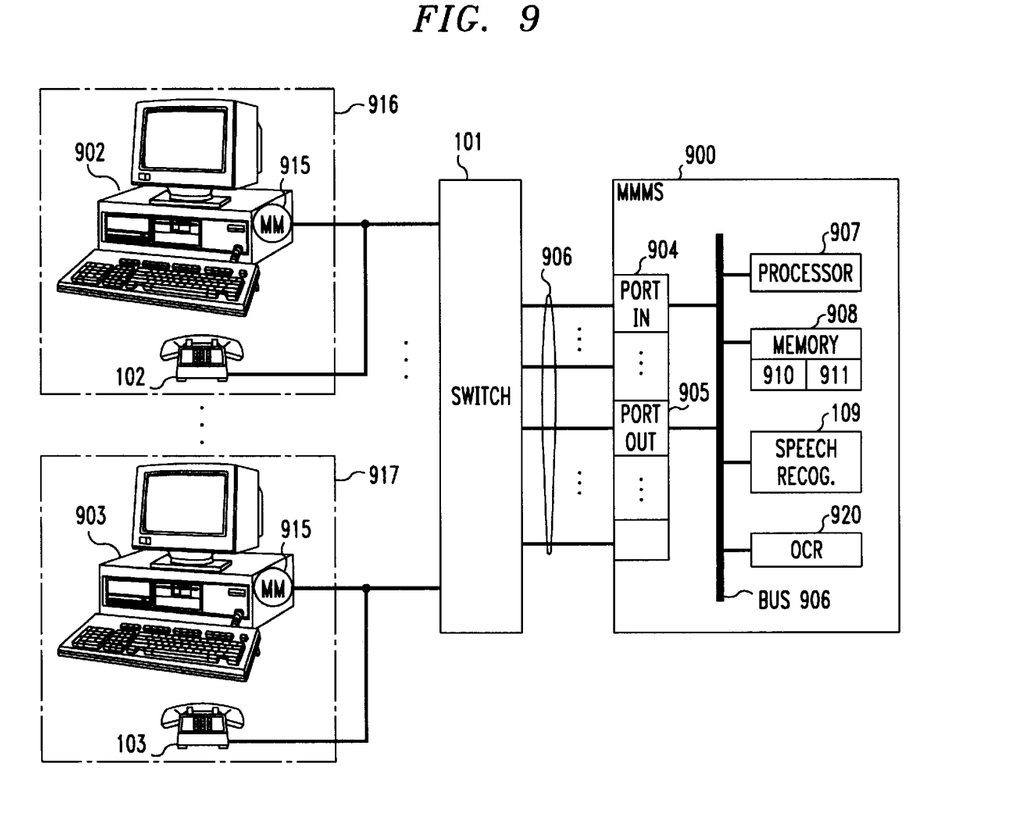
FIG. 9 is a block diagram of a second illustrative messaging system that implements a second illustrative embodiment of the invention.

FIG. 9 shows an alternative illustrative messaging system. It comprises a multi-media messaging system (MMMS) 900 connected by the conventional telephone switch 101 to a plurality of subscriber positions 916–917. Each subscriber position 916–917 includes a telephone 102–103, respectively, and a personal computer (PC) 902–903, respectively. Alternatively, each subscriber position 916–917 includes a multi-media workstation, such as the AT&T Vistium® system, which has telephone capability built in, and hence separate telephones 102–103 are not needed. Each personal computer 902–903 or multi-media workstation is equipped with a memory containing a message management (MM) program 915, such as the AT&T (now Lucent Technologies) Intuity® Message Manager, which provides a graphical user interface to MMMS 900. The memory containing MM 915 may be either the internal memory of PC 902–903 or an external portable memory device, such as a floppy disk, attached to (e.g., inserted in) a memory drive of PC 902–903. MMMS 900 is illustratively a multi-media messaging system again implemented on the AT&T (now Lucent Technologies) Conversant IVR platform, such as the AT&T (now Lucent Technologies) Intuity® system. MMMS 900 comprises a plurality of line input ports (PORT IN) 904 and a plurality of line output ports (PORT OUT) 905 that are connected to switch 101 by telephone lines 906 and that serve as interfaces to MMMS 900. Ports 904 and 905 conventionally include DSPs for performing A-D and D-A conversion and Touch-Tone recognition functions. Ports 904 and 905 are connected by a digital bus (BUS) 906 to a control processor (PROC) 907, a bulk memory (MEM 908), optical character-recognition circuitry (OCR) 920, and speech recognition circuitry (SP. RECOG.) 109. MMMS 900 is also a stored-program-controlled unit, operating under control of programs 910 stored in memory 908 and executed by processor 907. Memory 908 also implements multi-media message mailboxes 911 of subscribers of the messaging system of FIG. 9. Mailboxes 911 store received messages for message recipients.

As described so far, the messaging system of FIG. 9 is conventional. According to the invention, the functionality of MMMS 900 is enhanced by inclusion, among programs 910, of control programs that implement a scratchpad facility shown in FIGS. 10–13 and 4–7, and the Message Manager is enhanced to provide a graphical user interface to this scratchpad facility. A subscriber of the messaging system of FIG. 9 accesses his or her mailbox 911 in MMMS 900 via MM 915, in the conventional manner, at step 1000 of FIG. 10. In response, a main menu of options of possible actions is displayed to the subscriber by MM 915 on the display screen of PC 902 or 903, at step 1002. The main menu conventionally includes an "access messages" option. The main menu is also expanded to include an "access scratchpad" option. The subscriber selects one of the options, by selecting an icon associated with that option and displayed by MM 915 on the display screen of PC 902 or 903, illustratively via a point-and-click device of PC 902 or 903, such as a mouse. MM 915 recognizes the selection and sends it to MMMS 900, which receives it at step 1004.

Figure 10:
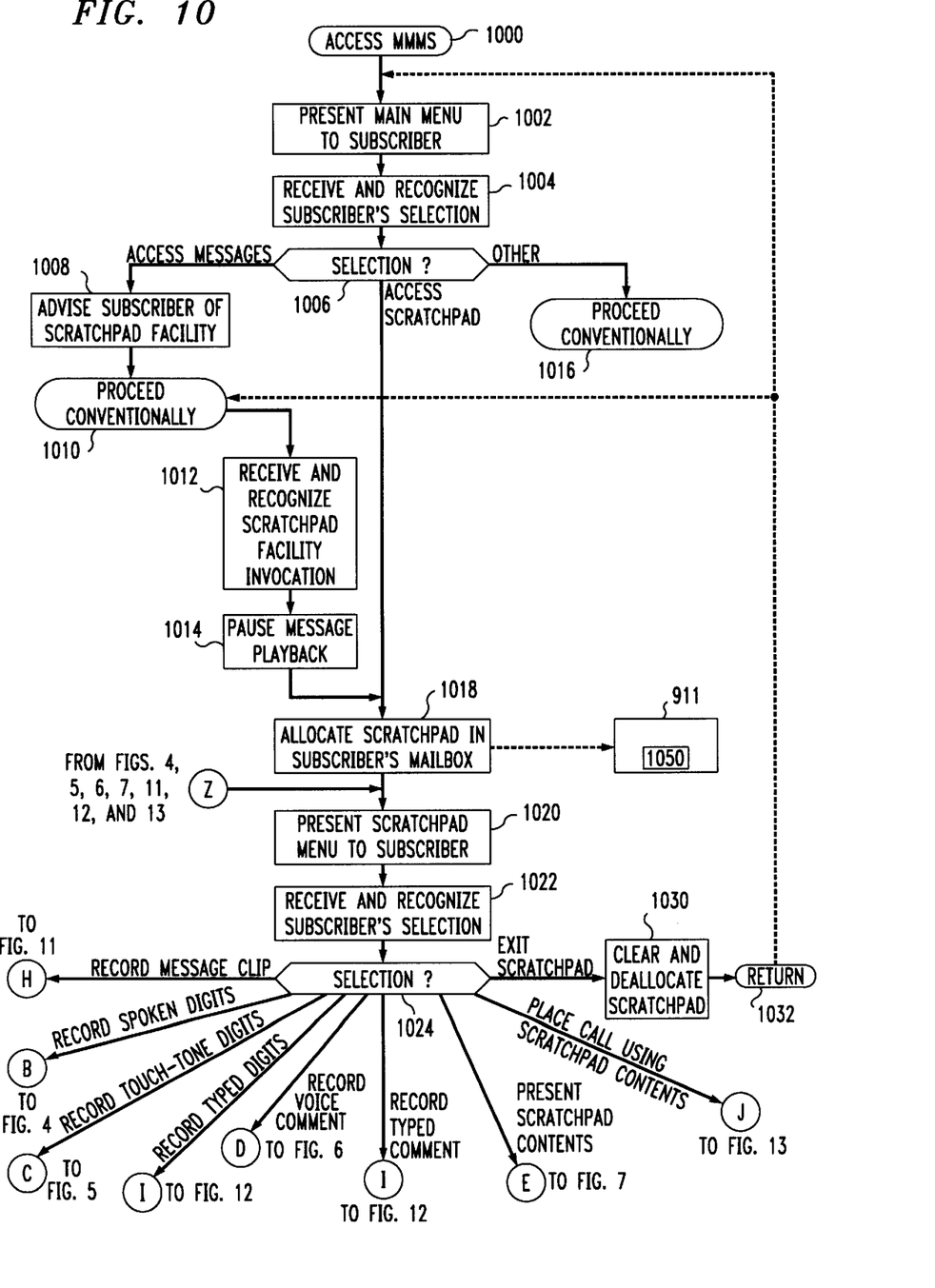

If the subscriber selects an option other than "access messages" or "access scratchpad", as determined at step 1006, MMMS 900 responds conventionally, at step 1018. If the subscriber selects the "access messages" option, MMMS 900 causes MM 15 to display to the subscriber the conventional message-access screen which has been enhanced with an icon for the scratchpad facility, and optionally also displays to the subscriber a message informing the subscriber that he or she may invoke the scratchpad facility at any time by pointing-and-clicking on the scratchpad icon, at step 1008. MMMS 900 then proceeds to interact with the subscriber in the conventional manner, at step 1010.

If at any time during the displaying of message headers or during message playback (retrieval of the message body), at step 1010, the subscriber invokes the scratchpad facility, as determined at step 1012, MMMS 900 pauses any message playback that it was engaged in, at step 1014, and then proceeds as if the subscriber had selected the "access scratchpad" option at step 1004, at step 1018.

Following step 1014, or if the subscriber is determined to have selected the "access scratchpad" option at step 1006, MMMS 900 creates a scratchpad 1050 memory area in the subscriber's mailbox 911, at step 1018, and then causes MM 915 to display to the subscriber a scratchpad menu. The scratchpad menu is a display of icons corresponding to the following options: record message clip, record spoken digits, record Touch-Tone digits, record typed digits, record comment, present scratchpad contents, and place call using scratchpad contents. The user selects an option from the displayed menu by pointing and clicking with the point-and-click device of PC 902 or 903.

Figure 11:
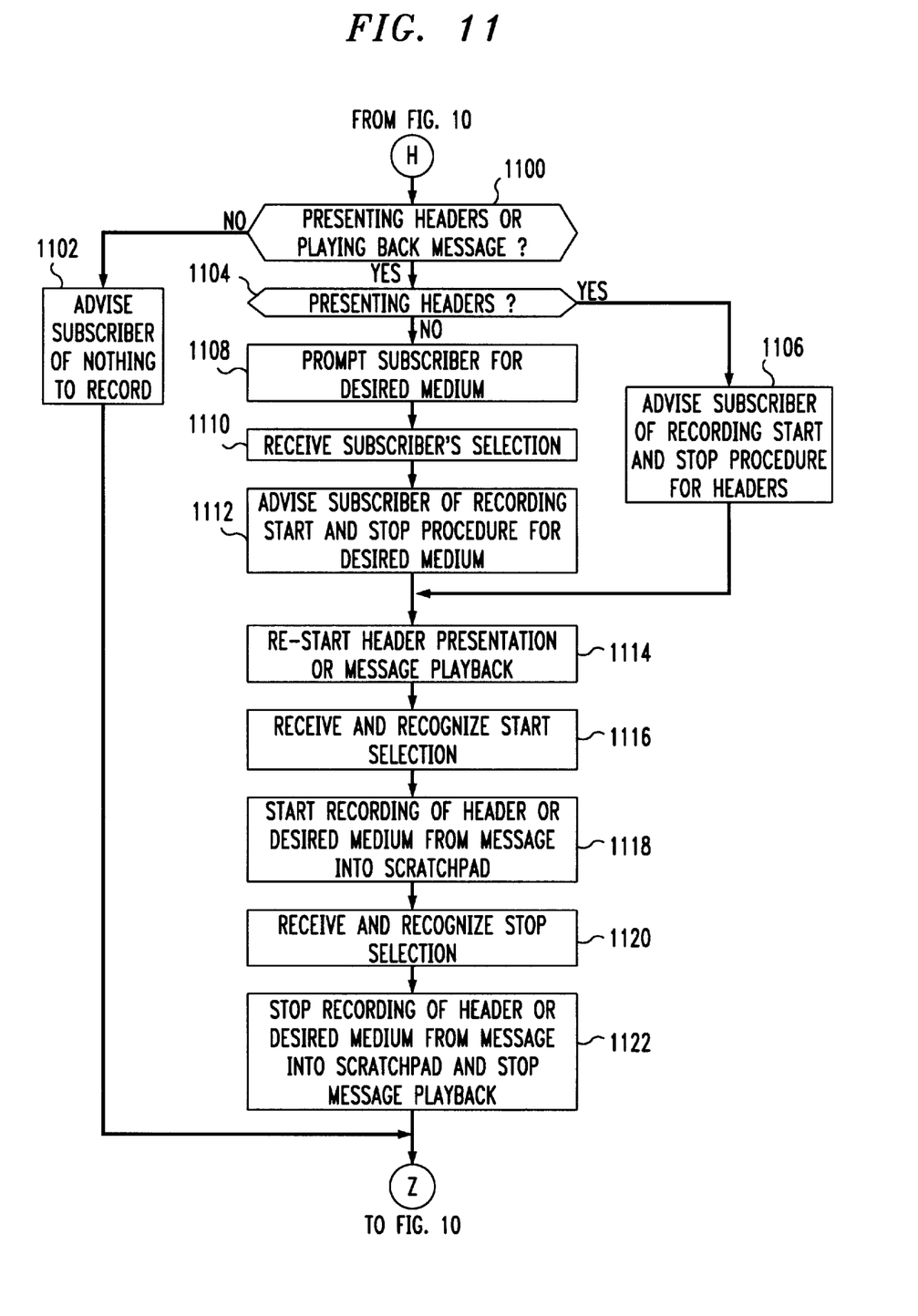

If the subscriber selects to record a message clip, as determined at step 1024, MMMS 900 checks whether it was in the process of presenting headers or playing a message, i.e., whether it reached steps 1018 et seq. via steps 1008 and 1010, at step 1100 of FIG. 11. If not, MMMS 900 causes MM 915 to display to the subscriber a message indicating that there is nothing to record, at step 1102, and then returns to step 1010 of FIG. 10. If MMMS 900 was in the process of displaying message headers to the subscriber, as determined at steps 1100 and 1104, MMMS 900 causes MM 915 to display to the subscriber a message advising the subscriber to demarcate the header portion that is to be stored in scratchpad 1050 by pointing-and-clicking the point-and-click device at the beginning of the header portion that is to be stored in scratchpad 1050, drag the pointer across the header portion that is to be stored in scratchpad 1050, and release the point-and-click device at the end of the header portion that is to be stored in scratchpad 1050, at step 1106. If MMMS 900 was in the process of playing back a message to the subscriber, as determined at steps 1100 and 1104, MMMS 900 causes MM 915 to prompt the subscriber to indicate the medium of the message clip that the subscriber wishes to record in scratchpad 1050, at step 1108. Illustratively, MMMS 900 does this by causing MM 915 to display icons for each of the media components that are present in the message and to prompt the subscriber to point-and-click at one of the displayed icons. Upon receiving the subscriber's selection of the message medium, at step 1110, MMMS 900 causes MM 915 to display to the subscriber the clip demarcation procedure for the desired medium, at step 1112. For example, if the subscriber selects to record an audio or moving-image clip, MMMS 900 causes MM 915 to display a "start" and a "stop" icon and a message asking the subscriber to point-and-click at the "start" icon at the point in the playback of the message at which the subscriber wants to commence recording of the message into scratchpad 1050, and to point-and-click at the "stop" icon at the point in the playback of the message at which the subscriber wants to cease recording of the message into scratchpad 1050. But if the subscriber selects to record a still image clip, a fax clip, or a text clip, MMMS 900 causes MM 915 to display to the user the demarcation procedure that was displayed at step 1106. Following step 1106 or 1112, MMMS 900 re-starts the presentation of the message headers or playback of a message to the subscriber from the beginning, at step 1114. Upon receiving and recognizing the subscriber's recording-start selection, at step 1116, MMMS 900 commences to record the selected header portion or message medium into scratchpad 1050, at step 1118. Upon receiving and recognizing the subscriber's recording-stop selection, at step 1120, MMMS 900 completes recording the selected header portion or message medium into scratchpad 1050 and also ceases any message playback that it had started at step 1114, at step 1122. MMMS 900 then returns to step 1020 of FIG. 10.

If the subscriber selects to record spoken digits, Touch-Tone digits, or a spoken comment, MMMS 900 proceeds as shown in FIGS. 4–6, respectively, and described above. Control communications with the subscriber may instead be carried on by displaying messages and icons and receiving point-and-click device selections.

Likewise, if the subscriber selects to be presented with scratchpad contents, MMMS 900 proceeds as shown in FIG. 7 and described above, where playback at step 704 involves displaying scratchpad 1050 contents on the display of the subscriber's PC 902 or 903 in the cases where scratchpad 1050 contains static media information (e.g., text, fax, still image). Again, control communications with the subscriber may instead be carried on by displaying messages and icons and receiving point-and-click device selections.

Figure 12:
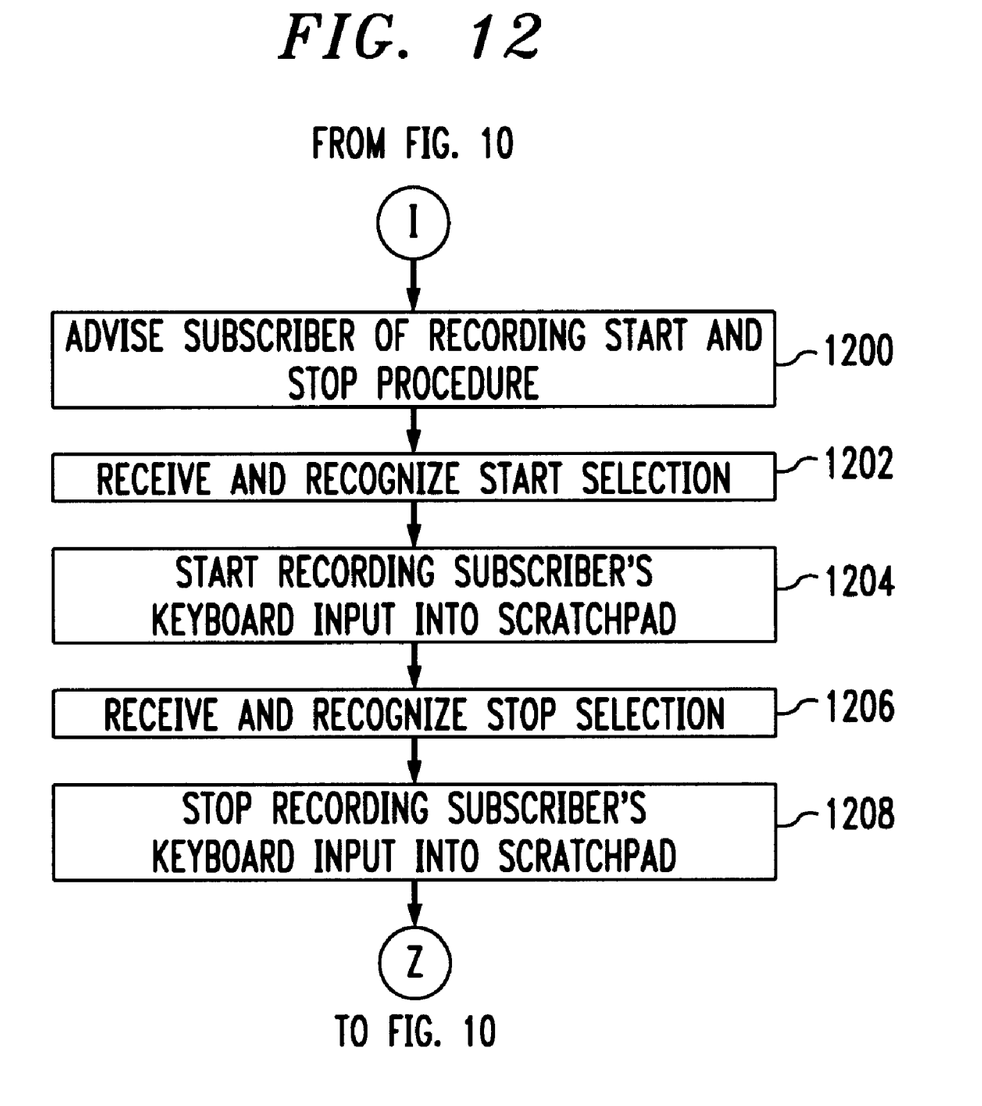

If the subscriber selects to record digits or a comment typed in by the subscriber on the keyboard of PC 902 or 903, as determined at step 1024, MMMS 900 causes MM 915 to display to the subscriber a recording "start" and a recording "stop" icon, and a message advising the subscriber to point-and-click at the "start" icon before starting to type on the keyboard the digits or characters that are to be stored in scratchpad 1050, and to point-and-click at the "stop" icon when finished typing the digits or characters, at step 1200. Alternatively, MM 915 displays a "text box" into which the subscriber may type the digits or comment. Upon receiving and recognizing the subscriber's recording-start selection, at step 1202, MMMS 900 commences to record the subscriber's keyboard input into scratchpad 1050, at step 1204. Upon receiving and recognizing the subscriber's recording stop selection, at step 1206, MMMS 900 ceases to record the subscriber's keyboard input into scratchpad 1050, at step 1208. MMMS 900 then returns to step 1020 of FIG. 10.

Figure 13:
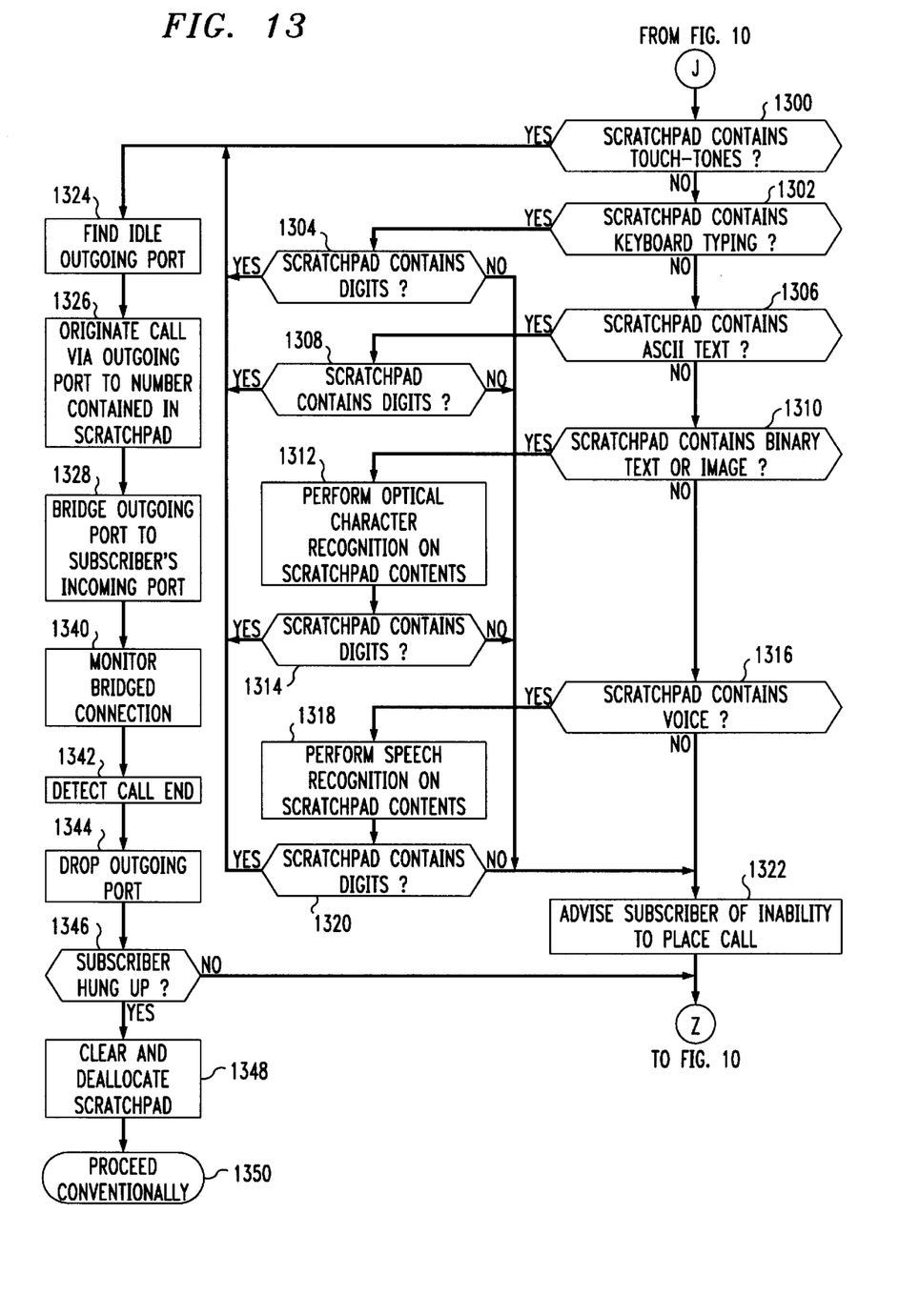

If the subscriber selects to place a call using the scratchpad contents, as determined at step 1024, MMMS 900 examines the scratchpad contents to determine if scratchpad 1050 contains Touch-Tones, at step 1300, keyboard typing, at step 1302, ASCII text, at step 1306, binary text or image, at step 1310, or voice, at step 1316. If scratchpad 1050 contains none of the above, MMMS 900 causes MM 915 to display to the subscriber a message informing the subscriber that a call cannot be placed by using scratchpad contents, at step 1322, and then returns to step 1020 of FIG. 10. If scratchpad 1050 contains Touch-Tones, MMMS 900 places a call to the telephone number represented by those digits, at steps 1324–1350 which duplicate the steps 808–824, respectively, of FIG. 8. If scratchpad 1050 contains keyboard typing, MMMS 900 examines the typing to determine if it contains digits, at step 1304. If the typing contains digits, MMMS 900 proceeds to steps 1324 et seq. If the typing does not contain digits, MMMS 900 proceeds to steps 1322 et seq. If scratchpad 1050 contains binary text or image, MMMS 900 processes the scratchpad contents through optical character-recognition (OCR) circuit 920, at step 1312, and then determines from the results of OCR whether scratchpad 1050 contains digits, at step 1314. If the binary text or image in scratchpad 1050 contains digits, MMMS 900 proceeds to steps 1324 et seq. If the binary text or image does not contain digits, MMMS 900 proceeds to steps 1322 et seq. If scratchpad 1050 contains voice, MMMS 900 processes the scratchpad contents through voice-recognition circuit 119, at step 1318, and then determines from the results of voice recognition whether scratchpad 1050 contains digits, at step 1320. If scratchpad 1050 contains digits, MMMS 900 proceeds to steps 1324 et seq; if scratchpad 1050 does not contain digits, MMMS 900 proceeds to steps 1322 et seq.

Alternatively, MMMS 900 may permit the message recipient to establish communications other than calls by using the contents of scratchpad 1050. For example, it may permit the message recipient to automatically send an e-mail message to an Internet address contained in scratchpad 1050.

If the subscriber again selects one of the recording options at step 1022, the additional recording is either made over the previous recording in scratchpad 1050, or is appended to the previous recording in scratchpad 1050, at the system administrator's option.

Of course, various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

The invention claimed is:

1. In a messaging system having a memory including means for storing messages received for a message recipient from message senders and each comprising a message header that contains message address information and a message body that contains information being communicated y the message sender to the message recipient, a user interface enabling the message recipient to communicate with the messaging system and retrieve the stored messages, and a controller connected to the user interface and to the memory for controlling operation of the messaging system, the improvement comprising:

first means in the controller responsive to receipt of a first command from the message recipient during retrieval of the message body of a stored message for halting the retrieval of the message body, thereafter responsive to information received from the message recipient for storing a fragment of the message body that is identified by the information in the memory for subsequent use by the message recipient, and responsive to receipt of a second command from the message recipient for resuming the retrieval of the message body; and second means in the controller responsive to a third command received from the message recipient, for establishing a communication from the message recipient to a destination identified by the stored fragment.

2. The improvement of claim 1 wherein:

the retrieved stored message comprises a message header and the message body.

3. The improvement of claim 1 wherein:

the information received from the message recipient comprises one of words spoken by the message recipient into a user terminal connected to the user interface, Touch-Tone signals entered by the message recipient on a user terminal connected to the user interface, and alphanumeric characters typed by the message recipient on a user terminal connected to the user interface.

4. The improvement of claim 1 wherein:

the second means are further for at least one of (a) presenting the stored fragment back to the message recipient, and (b) automatically establishing a communication from the message recipient to a destination whose address is included in the stored fragment.

5. The improvement of claim 1 wherein:

the second means are further for at least one of (a) presenting the stored fragment back to the message recipient, and (b) automatically addressing and sending a message from the message recipient to a destination whose address is included in the stored fragment.

6. The improvement of claim 1 wherein:

the second means are further for at least one of (a) presenting the stored fragment back to the message recipient, and (b) automatically generating a telephone call to a destination whose telephone number is included in the stored fragment.

7. The improvement of claim 1 wherein:

the first means are responsive to receipt of the information from the message recipient during retrieval of a stored message, for demarcating a portion of the retrieved stored message under control of the message recipient; and the second means are responsive to the third command, for at least one of (a) presenting the demarcated portion back to the message recipient, and (b) establishing a communication from the message recipient to a destination by using information contained in the demarcated portion.

8. The improvement of claim 7 wherein:

the second means are for at least one of (a) presenting the demarcated portion back to the message recipient, and (b) automatically establishing a communication from the message recipient to a destination whose address is contained in the demarcated portion.

9. The improvement of claim 1 wherein:

the first means are responsive to receipt of the information from the message recipient during retrieval of a stored message, for extracting a portion of the retrieved stored message under control of the message recipient and storing the extracted portion in the memory separately from the retrieved stored message; and the second means are responsive to the third command, for at least one of (a) presenting the stored extracted portion back to the message recipient, and (b) establishing a communication from the message recipient to a destination by using information contained in the stored extracted portion.

10. The improvement of claim 9 wherein:

the second means are for at least one of (a) presenting the stored extracted portion back to the message recipient, and (b) automatically addressing and sending a message from the message recipient to a destination whose address is contained in the stored extracted portion.

11. The improvement of claim 9 wherein:

the second means are for at least one of (a) presenting the stored extracted portion back to the message recipient, and (b) automatically generating a telephone call to a destination whose telephone number is contained in the stored extracted portion.

12. The improvement of claim 1 wherein:

the first means are responsive to first said information for storing the fragment, and are responsive to second said information for storing the second information in the memory for subsequent use by the message recipient; and the second means are responsive to the third command for at least one of (a) presenting the stored fragment or second information back to the message recipient, and (b) establishing a communication from the message recipient to a destination identified by the stored fragment or second information.

13. The improvement of claim 12 wherein:

the information received from the message recipient comprises one of words spoken by the message recipient into a user terminal connected to the user interface, Touch-Tone signals entered by the message recipient on a user terminal connected to the user interface, and alphanumeric characters typed by the message recipient on a user terminal connected to the user interface.

14. In a messaging system having a memory including a mailbox for storing messages received for a message recipient from message senders and each comprising a message header that contains message address information and a message body that contains information being communicated by the message sender to the message recipient, a user interface enabling the message recipient to communicate with the messaging system and retrieve the stored messages from the mailbox, and a controller connected to the user interface and the memory for controlling operation of the messaging system, the improvement comprising:

first means in the controller, responsive to invocation of a scratchpad facility by a message recipient either during presentation of an options menu to the message recipient or during retrieval of a stored message by the message recipient, for halting any said stored message retrieval or any said options menu presentation and presenting a scratchpad menu of scratchpad options to the message recipient;

second means in the controller, responsive to invocation of a recording option by the message recipient from the scratchpad menu, for storing information received from the message recipient in a scratchpad of the mailbox for subsequent use by the message recipient;

third means in the controller, responsive to invocation of a play-back option by the message recipient from the scratchpad menu, for presenting contents of the scratchpad to the message recipient;

fourth means in the controller, responsive to invocation of an exit option by the message recipient from the scratchpad menu, for ceasing the presenting of the scratchpad menu to the message recipient and resuming an activity that was halted when the message recipient invoked the scratchpad facility;

fifth means in the controller, responsive to invocation of a message-clipping option by the message recipient from the scratchpad menu, for extracting a portion, selected by the message recipient, of the body of the retrieved stored message and storing the extracted portion in the scratchpad for subsequent use by the message recipient; and sixth means in the controller, responsive to invocation of a communication option by the message recipient from the scratchpad menu, for automatically establishing a communication from the message recipient to a destination by using an address stored in the scratchpad by action of either one of the second means and the fifth means.

15. The improvement of claim 14 wherein:

the information received from the message recipient comprises at least one of (a) words spoken by the message recipient into a user terminal connected to the user interface, (b) Touch-Tone signals entered by the message recipient on the user terminal, and (c) alphanumeric characters typed by the message recipient on the user terminal.

16. The improvement of claim 14 wherein:

the retrieved stored message comprises a message header and a message body, and the extracted portion comprises at least one of (a) a portion of the message header and (b) a portion of the message body.

17. The improvement of claim 14 wherein:

the sixth means are for automatically generating a telephone call to a destination whose telephone number is included in the message portion stored in the scratchpad area.

18. A graphical user interface to a messaging system having a memory for storing messages received for a message recipient from message senders and each comprising a message header that contains message address information and a message body that contains information being communicated by the message sender to the message recipient and a system interface for communicating with the graphical user interface to enable the message recipient to interact with the messaging system via the graphical user interface and retrieve the stored messages, the graphical user interface comprising:

first means responsive to receipt of a first command from the message recipient during retrieval of the message body of a stored message, for causing the messaging system to halt the retrieval of the message body and to store a fragment of the message body that is identified by information received from the message recipient in the memory for subsequent use by the message recipient, and thereafter responsive to receipt of a second command from the message recipient for causing the messaging system to resume the retrieval of the message body; and second means responsive to receipt of a third command from the message recipient, for causing the messaging system to establish a communication from the message recipient to a destination identified by the stored fragment.

19. The graphical user interface of claim 18 wherein:

the first means are responsive to the receipt of the first command from the message recipient during retrieval of a stored message, for causing the messaging system to extract a portion, selected by the message recipient, of the retrieved stored message and to store the extracted portion in the memory; and the second means are further responsive to the third command for at least one of (a) causing the messaging system to present the stored extracted portion back to the message recipient, and (b) causing the messaging system to automatically establish a communication from the message recipient to a destination identified by using an address contained in the stored extracted portion.

20. The graphical user interface of claim 18 wherein:

the first means are responsive to first said information for storing the fragment, and are responsive to second said information for storing the second information in the memory for subsequent use by the message recipient; and the second means are responsive to the third command for causing the messaging system to at least one of (a) present the stored fragment or second information back to the message recipient, and (b) establish a communication from the message recipient to a destination identified by the stored fragment or second information.

21. The graphical user interface of claim 20 comprising:

a computer-usable program storage device having said first, second, and third means embodied therein, said first, second, and third means being computer-readable program code means for causing the computer to perform the functions of the graphical user interface.

* * * * *